(12) United States Patent
Amma et al.

(10) Patent No.: US 7,950,420 B2
(45) Date of Patent: May 31, 2011

(54) FLEXIBLE HOSE FOR CONVEYING FLUIDS OR GASES

(75) Inventors: Achim Amma, Richmond, VA (US); Andreas Graudus, Duillier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 554 days.

(21) Appl. No.: 12/215,488

(22) Filed: Jun. 27, 2008

(65) Prior Publication Data
US 2009/0320952 A1 Dec. 31, 2009

(51) Int. Cl.
*F16L 11/00* (2006.01)

(52) U.S. Cl. ..... 138/125; 138/124; 138/137; 428/36.91; 428/36.3; 428/36.2

(58) Field of Classification Search .......... 138/125–126, 138/137, 140; 428/36.1, 36.2, 36.3, 36.9, 428/36.91
See application file for complete search history.

(56) References Cited

U.S. PATENT DOCUMENTS

| | | | | |
|---|---|---|---|---|
| 3,722,550 | A | * | 3/1973 | Matthews ...................... 138/137 |
| 3,755,032 | A | * | 8/1973 | Higbee ........................... 156/86 |
| 3,918,499 | A | * | 11/1975 | Higbee ........................... 138/125 |
| 4,142,554 | A | * | 3/1979 | Washkewicz et al. ........ 138/125 |
| 4,394,705 | A | * | 7/1983 | Blachman ...................... 361/215 |
| 4,585,035 | A | * | 4/1986 | Piccoli ............................. 138/127 |
| 4,699,178 | A | * | 10/1987 | Washkewicz et al. ........ 138/125 |
| 5,372,163 | A | * | 12/1994 | Kokuryu et al. ............... 138/126 |
| 5,445,191 | A | * | 8/1995 | Green et al. ................... 138/126 |
| 6,626,211 | B2 | * | 9/2003 | Mizutani et al. .............. 138/126 |
| 7,086,420 | B2 | | 8/2006 | Kahn et al. |
| 7,614,428 | B2 | * | 11/2009 | Henry et al. ................... 138/124 |
| 2005/0008807 | A1 | | 1/2005 | Wilson et al. |
| 2008/0072984 | A1 | * | 3/2008 | Branch et al. ................. 138/124 |

FOREIGN PATENT DOCUMENTS

| | | |
|---|---|---|
| DE | 10 2004 051073 A1 | 5/2006 |
| EP | 0 969 236 A2 | 1/2000 |
| EP | 1 477 298 A1 | 11/2004 |
| GB | 1 394 723 | 5/1975 |
| JP | 2006/161225 | 6/2006 |
| WO | WO 2006/058676 A1 | 6/2006 |

* cited by examiner

*Primary Examiner* — Patrick F Brinson

(57) ABSTRACT

A flexible hose for conveying fluids or gases comprises two elastomeric layers surrounding either side of a reinforcement layer.

8 Claims, 1 Drawing Sheet

US 7,950,420 B2

FLEXIBLE HOSE FOR CONVEYING FLUIDS OR GASES

BACKGROUND OF INVENTION

1. Field of Invention

The present invention is directed to an improved flexible hose for conveying fluids or gases.

2. Description of the Related Art

U.K. Patent Specification 1 394 723 discloses an improved oil suction and discharge hose having a multilayer construction.

EP 0 969 236 A2 discloses a kink resistant high pressure hose having a degree of flexibility.

DE 10 2004 051 073 A1 describes a hose containing a textile reinforcement layer of meta-aramid yarns or plied yarns made from filaments with a length of 200 to 1400 mm present between elastomeric layers.

U.S. Pat. No. 7,086,420 describes a hose containing a textile reinforcement layer made from polyphenylene sulfide yarns.

U.S. Patent Application Publication 2005/0008807 A1 discloses an air conditioning hose having a multilayer construction.

While it is well known in the prior art to form hoses having multilayer construction, a need is present for an improved flexible hose which can be constructed on conventional equipment employed for hose construction.

SUMMARY OF THE INVENTION

The present invention is directed to a flexible hose adapted for conveying fluids or gases under pressure, said hose extending in an axial direction along a central longitudinal axis and in a radial direction circumferentially about said longitudinal axis, said hose comprising in order a core tube (2) having a circumferential inner core tube surface and an opposing circumferential outer core tube surface, said core tube (2) comprising a first elastomeric layer, a reinforcement layer (3) surrounding the outer core tube having a circumferential inner core reinforcement surface and an opposing circumferential outer core reinforcement surface, said reinforcement layer (3) being of knitted, spiral wound, or braided construction, said reinforcement layer (3) formed from at least one yarn (5), said yarn (5) having a linear density from 1000 to 4000 dtex, said yarn (5) composed of 2 to 5 yarn strands (6), said yarn strands (6) being ply-twisted to 1 to 5 twist multiplier, said yarn strands (6) composed of 1 to 5 spun yarns (7), said spun yarns (7) being ply-twisted to 1 to 5 twist multiplier, said spun yarns (7) comprising a linear density from 100 dtex to 1000 dtex, said spun yarns (7) comprising filaments having a length from 80 to 150 mm, said spun yarns (7) comprising a twist of at least 200 turns per meter, and said spun yarns (7) comprising filaments selected from the group consisting of poly m-phenylene terephthalamide, poly methylene-1,3-benzobisoxazole, polyoxadiazole, polysulfonamide, polyarylene sulfide, polybenzimidazole, polybenzthiazole, polybenzoxaole, polyoxadiazole, polysulfonamide, polybenzimidazole, polybenzthiazole, polybenzoxaole or mixtures thereof, and a second elastomeric layer (4) surrounding said reinforcement layer (3) on said circumferential outer core reinforcement surface.

DETAILED DESCRIPTION OF THE INVENTION

Figure 1:
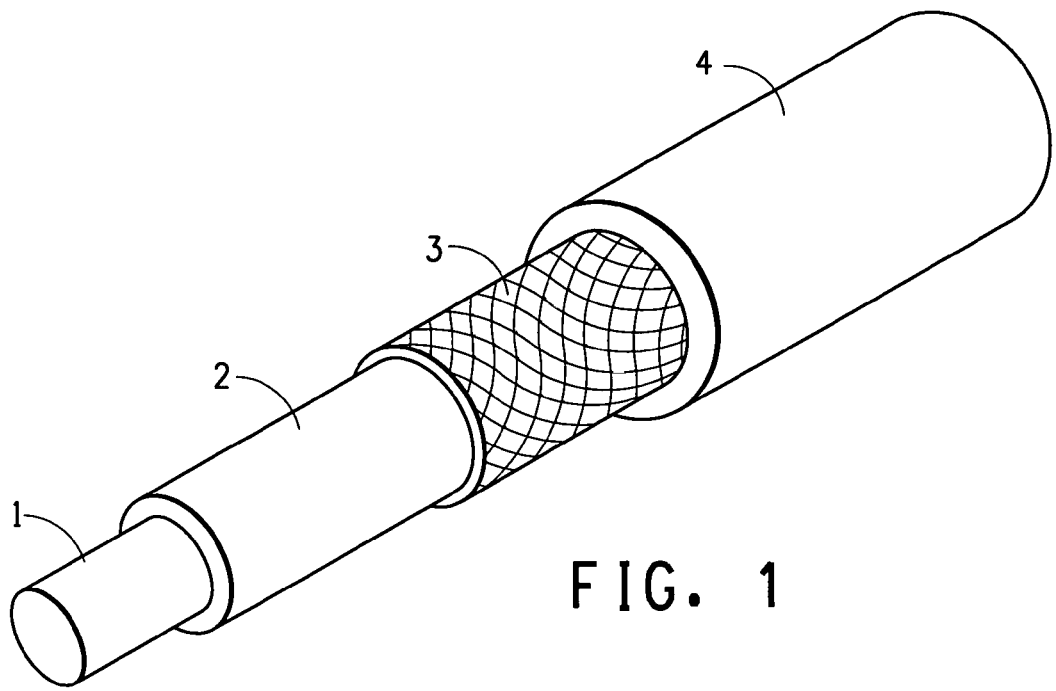
FIG. 1 is a schematic of a hose of the present invention showing a multilayer construction.
Figure 2:
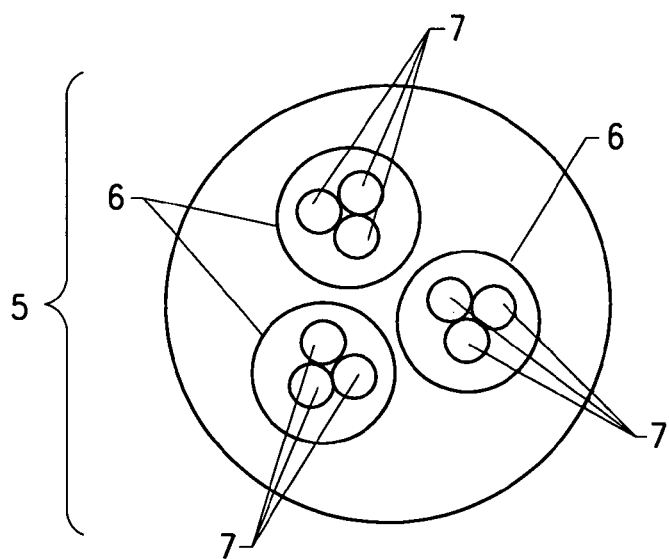
FIG. 2 is a cross section of a yarn employed in the hose.

A description of the various layers necessary for the reinforced hose is initially from an inner surface which is closest to a fluid or gas to be conveyed. The description of the remaining layers is in order extending from the inner surface.

A first requirement is for a core tube (2) having a circumferential inner surface which conventionally contacts the fluid or gas and an opposing circumferential outer tube surface. The materials suitable for core tube (2) are elastomeric and are well known in the art. Suitable examples include hydrogenated nitrile rubber, silicone rubber, fluorosilicone rubber, methphenylsilicone rubber, natural rubber, EPDM, CPE and acrylic rubber. EPDM means ethylene propylene diene monomer rubber; CPE means chlorinated polyethylene.

It is understood the elastomeric material which is chosen will be dependent on the final use of the hose. Illustratively if a corrosive substance is to be transported through the hose, the elastomeric material is chosen to withstand such corrosion.

A reinforcement layer (3) surrounds the outer core tube surface and is of knitted, spiral wound or braided construction. This reinforcement layer (3) is formed from at least one yarn (5) having a linear density in a range from 1,000 to 4,000 dtex. The yarn or yarns (5) are composed of 2 to 5 yarn strands (6) that are ply-twisted to a 1 to 5 twist multiplier. In turn the yarn strands (6) are composed of 1 to 5 spun yarns (7) that are ply-twisted to a 1 to 5 twist multiplier.

Criticality is present in this invention in the spun yarns (7). It is required that the spun yarns (7) have a linear density in a range from 100 dtex to 1000 dtex. A more preferred range is from 200 dtex to 600 dtex. Additionally the spun yarns (7) are formed from filaments having a length in a range from 80 to 150 mm. Generally a more preferred range will be 90 to 120 mm. The spun yarns have a twist of more than 200 turns per meter. An example of a preferred range is 450 to 750 turns per meter.

As a further requirement for criticality the spun yarns are formed from poly m-phenylene terephthalamide, poly methylene-1,3-benzobisoxazole, polyoxadiazole, polysulfonamide, polyarylene sulfide, polybenzimidazole, polybenzthiazole, polybenzoxaole, polyoxadiazole, polysulfonamide, polybenzimidazole, polybenzthiazole, polybenzoxaole or mixtures thereof. Preferred are poly m-phenylene terephthalamide or polyarylene sulfide.

Optionally a finish including a wax may be applied as an outer-coating on the spun yarns (7), yarn strands (6) or yarn (5). Suitable examples include polyethylenoxide based finishes and hydrocarbon based waxes.

Optionally an adhesive coating may be applied as an outer-coating on the spun yarns (7), yarn strands (6) or yarn (5). Suitable examples are epoxy, isocyanate or RFL based coatings commonly known to skilled in the art for improving the adhesion between reinforcement layer (3), core tube (2) and elastomeric layer (4). RFL stands for resorcinol formaldehyde latex.

An elastomeric layer (4) surrounds the reinforcement layer (3) on its outer surface. The type of elastomer can be the same or different in comparison to the core (2).

It is understood that various constructions may be employed. Illustratively, more than two reinforcement layers (3) can be utilized. Furthermore, the core tube (2) can be lined on its inner surface with a fluorocarbon based material (1) which will contact the fluid or gas to be transported. Suitable examples of such materials include poly(tetrafluoroethylene) and perfluoroalkoxy polymer.

There is a need for an improved flexible hose that can operate at temperatures above 200° C., posses increased volumetric expansion capability and demonstrates increased fatigue life performance under dynamic load applications. Properties of the reinforcement layer—and consequently the properties of the reinforcing yarn—are in direct correlation to these three hose performance criteria.

The continuous use temperature of a particular yarn in the hose reinforcing layer determines the effectiveness of the reinforcement at increased temperature.

Elongation of the reinforcing yarn determines the volumetric expansion capability of the hose. The higher the volumetric expansion, the more effective a hose is in absorbing sudden pressure peaks. This will result in a decrease of flow pressure peaks of the fluids or gases that are transported within the system that the hose is a component of.

Incompatibility of the modulus of the reinforcing yarn with the rubber that forms the core tube and elastomeric layers of a hose leads to hose failure under dynamic load applications. This failure mode is especially prominent with reinforcement yarn of high modulus.

Reinforcement yarn as described in this invention fulfills all three hose performance criteria mentioned above.

Table 4 summarizes properties of high performance yarns known to a person skilled in the art of reinforced hose manufacture In the following examples, all parts and percentages are by weight and degrees in centigrade unless otherwise indicated.

Test Methods

Tensile Properties of yarns were determined according to ASTM D 885. Measurements were performed on an Instron 5860 Series test instrument purchased from Instron, Norwood, Mass. 4C clamps were employed for yarn samples in the 200 Denier-1600 Denier range while 4D clamps were used for 1600 Denier-3000 Denier yarn samples. Gauge length was 10 inches (25.4 cm) and crosshead speed was set to 12 inches/min (30.5 cm/min). Continuous filament yarn was twisted to 1.4 Twist Multiplier. Yarn with discontinuous filaments was tested as received.

Denier (d) is measured according to ASTM D 1577 and is the linear density of a fiber as expressed as weight in grams of 9000 meters of fiber. The denier is measured on a Vibroscope from Textechno of Munich, Germany. Denier times (10/9) is equal to decitex (dtex).

Yarn Number Systems: (1) English Cotton Count describes the number of 840 yard hanks per one pound of thread: $N_e$=Yards/(840*Pounds). English Cotton Count can be converted to Denier by dividing 5315 by $N_e$ (2) Metric Yarn Number describes the length in meters of 1 gram of thread: $N_m$=(y meters)/(x grams). It can be converted to denier by multiplying (x grams)/(y meters)*9000.

Twist Multiplier (TM) is described as the ratio of turns per meter (TPM) to the square root of the dtex of the yarn. It can be calculated with the following equation: TM=(TPM)*(sqrt(dtex))/3000.

EXAMPLE 1

The following example demonstrates the production differences of yarn suitable for this invention to the production process of yarn made from discontinuous filaments with filament length range of 20-60 mm as described in Comparative Example A and filament length range of 200-1400 mm as described in Comparative Example B.

In a Schlumberg converter, NOMEX® 430 m-aramid tow of 100 ktex, 2.0 dpf was converted to 20 ktex, 2.0 dpf NOMEX® top with an average filament length of 100 mm. The top was then converted into $N_m$=40/3 (675 d) spun-yarn using worsted spinning technology (>500 TPM in S- and Z-direction). Alternatively, this yarn can be produced in a continuous process similar to the one described in U.S. Pat. No. 2,721,440. Three ends of this yarn were ply-twisted to 1.7 TM. The plied yarn was coated with 1.0 wt % (based on unfinished fiber weight) of a waxy finish and heat set.

EXAMPLE 2

The following example demonstrates the influence of filament length on yarn tenacity. A hose reinforced with yarn of high tenacity will show high burst pressure. Table 1 lists the tenacity of yarn made from NOMEX® staple of 50 mm uniform filament length as described in Comparative Example A. Versus continuous multi-filament yarn (NOMEX® 430, 1200 d, 2 dpf), its tenacity is reduced by 60%. Yarn as described in Example 1 made from discontinuous filaments with an average filament length of 100 mm has only a 20% loss in tenacity versus continuous filament yarn. As reference, WO 2006/058676 lists Teijinconex® KB m-aramid yarns made from 400-600 mm long discontinuous filaments produced as described in Comparative Example B. Tenacities for 3478 dtex and 2270 dtex Teijinconex® KB yarns are listed as 39 cN/tex and 42 cN/tex respectively.

TABLE 1

Tenacity of NOMEX ® m-aramid yarns

| Filament length of yarn (mm) | Yarn count | Denier | Break Strength (lbs) | Tenacity (cN/tex) |
|---|---|---|---|---|
| 50 | $N_e$ = 14.7/1 | 361 | 1.6 | 18 |
| 100 (av.) | $N_m$ = 40/3 | 675 | 5.9 | 35 |
| Continuous | N/A | 1200 | 13.2 | 44 |

EXAMPLE 3

The following example demonstrates the influence of filament length on yarn loop tenacity. Loop tenacity is measured with the same procedure as in example 2 with the exception that two thread samples of the same yarn are being crossed and each clamp of the Instron tester is holding on to both ends of one thread sample. As such, the thread samples connect to each other through a loop. This test is indicative of the performance of yarn in knitted hose reinforcement constructions. A hose with knitted reinforcement layers of yarn of high loop tenacity will show high burst pressures. As can be seen in table 2, the loop tenacity of yarn made from NOMEX® staple of 50 mm uniform length as described in Comparative Example A is low. Yarn made from discontinuous filaments with an average length of 100 mm has superior performance over yarn made from 50 mm staple.

TABLE 2

Loop Tenacity of NOMEX ® m-aramid yarns

| Filament length of yarn (mm) | Yarn count | Denier | Loop Tenacity (cN/tex) |
|---|---|---|---|
| 50 | $N_e = 14.7/1$ | 361 | 19 |
| 100 (av.) | $N_m = 40/3$ | 675 | 27 |
| Continuous | N/A | 1200 | 36 |

EXAMPLE 4

Examples 4 through 6 demonstrate the performance of a 3-ply m-aramid yarn with discontinuous filament length of 80-150 mm produced as described in example 1 in hose manufacture and hose testing versus the performance of commercially used two-ply 1200 d NOMEX® 430 continuous multi-filament yarn that is described in Comparative Example C. For hose testing, it is necessary to compare hoses with identical burst pressures. Example 4 demonstrates the derivation of the reinforcement structure of the otherwise identical hoses used in example 5 and 6 for hose manufacture and hose testing. Theoretical burst pressures of hoses with plain stitch knitted fabric reinforcement can be calculated with the following formula:

$$P = 2\ R\ C \sin(\Theta) F/D$$

with P=burst pressure

R=yarn breaking strength

C=stitches per 10 mm

Θ=knitting angle

F=efficiency factor

D=ply diameter

Yarn of example 1 has lower breaking strength than the continuous multi-filament yarn of Comparative Example C. To obtain a 19 mm inner diameter hose with approximately 20 bar burst pressure, yarn from example 1 has to be knitted with 4 stitches per 10 mm hose length while yarn from comparative example C has to be knitted with 3 stitches per 10 mm hose length.

EXAMPLE 5

The following example demonstrates the excellent processing characteristics of yarn produced as described in Example 1 on commercial hose manufacturing equipment outfitted with a circular knitting machine. EPDM based automotive heater hoses with 19 mm inner diameter that meet specifications set in SAE J20R3 were produced on commercial hose manufacturing equipment. The Harry Lucas knitting machine (available from Harry Lucas Textilmaschinen, Neumünster, Germany) was outfitted with eight 5-lbs feed yarn packages of yarn as described in Example 1. The hose feed was adjusted to produce 4 stitches per 10 mm hose along the longitudinal axis of the hose. A plain stitch pattern was used. No deposits were found on the knitting machine after the test and the hose reinforcement layer did not show any irregularities or defects. The hoses were cured on a straight mandrel and cut to 25 cm length. Table 3 lists the hoses produced.

EXAMPLE 6

The hoses produced as described in Example 4 and Comparative Example C were subjected to Pressure-Vibration-Temperature (PVT) performance tests common in the industry to assess long-term performance of hoses reinforced with both yarn types. The following procedure was followed: 100% ethylene glycol was cycled through a 25 cm long hose sample. The cycling of ethylene glycol was conducted in impulses with a trapezoidal pattern of 0.1 bar trough for 4.0 sec, 1.2 sec rise to 3 bar, a 3 bar crest for 4.0 sec and a 1.2 sec drop to 0.1 bar trough. The hoses were vibrated at 200 vibrations/min with an amplitude of ±10 mm. Ambient and fluid temperature was 135° C. The impulses were continued until hose failure occurred. Table 3 summarizes the results. The hose reinforced with yarn made from discontinuous filaments as described in Example 1 was still intact after more than 430959 cycles. The hose reinforced with a two-ply of 1200 d, 2 dpf continuous multi-filament yarn failed after 332967 cycles. These tests demonstrate that yarn as described in Example 1 has excellent long term performance. The testing and production of hoses with yarn as described in Comparative Example A was omitted as it is accepted industry knowledge that yarn made from 20-60 mm discontinuous filaments are unsuitable for knitted hose reinforcement (see DE 10 2004 051 073 A1).

EXAMPLE 7

Hoses as described in Example 4 and Comparative Example C were subjected to a second PVT test. The following procedure was followed: 100% ethylene glycol was cycled through a 25 cm long hose sample. The cycling of ethylene glycol was conducted in impulses with a trapezoidal pattern of 0.0 bar trough for 1.2 sec, 0.3 sec rise to 5.2 bar, a 5.2 bar crest for 1.2 sec and a 0.3 sec drop to 0.0 bar trough. The hoses were vibrated at 200 vibrations/min with a ±10 mm amplitude. Ambient and fluid temperature was 130° C. The test is run for 100000 cycles and demonstrates the performance of the reinforcement layer under extremely severe conditions. Burst tests according to ASTM D380 were conducted on untested control samples and samples after the PVT test. Retained burst pressure is reported in table 3. Hoses reinforced with yarn from Example 1 show excellent performance that is comparable to the performance of two-ply 1200 d, 2.0 dpf continuous multi-filament yarn reinforced hose.

TABLE 3

Hose constructions and testing

| Sample | Burst pressure at 0 cycles (bars) | Cycles to failure (Example 5) | Burst pressure after 100000 cycles (Example 6) (bars) |
|---|---|---|---|
| Hose with yarn from example 1 | 20.0 | >430959 | 16.3 |
| Hose with yarn from Comp. Example C | 20.3 | 332967 | 16.6 |

EXAMPLE 8

Property Comparison of Yarn of This Invention
Versus Other High Performance Yarns

TABLE 4

| | Yarn properties | | | | |
|---|---|---|---|---|---|
| Yarn | Filament length (mm) | Tenacity (cN/tex) | Elongation at break (%) | Modulus (cN/tex) | Cont. use temperature (° C.) |
| meta-aramid Yarn of Ex. 1 | 100 (av.) | 35 | 33 | 604 | 220 |
| NOMEX ® meta-aramid | cont. | 44 | 30 | 829 | 220 |
| Teijinconex ® KB meta-aramid yarn | 500 (av.) | 41 | 12 | 640 | 220 |
| Polyphenylene sulfide yarn | cont. | 49 | 24 | 450 | 170 |
| para-aramid yarn | cont. | 203 | 3 | 4900 | 150 |

COMPARATIVE EXAMPLE A

NOMEX® 430 m-aramid tow of 50 ktex, 2.0 dpf was cut to a uniform length of 50 mm, 2.0 dpf NOMEX® staple on a Lummus cutter. The staple was converted to $N_e$=14.7/1 open-end spun yarn at a commercial spun-yarn conversion facility.

COMPARATIVE EXAMPLE B

Yarn with filament lengths of 200-1400 mm can be produced as described in JP2006161225A. Stretch-breaking equipment is used to thin 33000 dtex tow to 1100 dtex and to break the continuous filaments of the tow to the desired 200-1400 mm filament length. The yarn is consolidated by air interlace jets. We believe that the air interlacing does not achieve the same quality of filament consolidation as worsted spinning does leading processing problems of the type of yarn in a variety of textile processing equipment as described in Example 4.

COMPARATIVE EXAMPLE C

EPDM based automotive heater hoses with 19 mm inner diameter that meet specifications set in SAE J20R3 were produced on commercial hose manufacturing equipment as described in Example 3 with the exception of using eight 5-lbs packages containing a two-ply product of 1200 d, 2.0 dpf continuous multi-filament yarn twisted to 1.7 TM. The hose feed was adjusted to produce 3 stitches per 10 mm hose along the longitudinal axis of the hose. No deposits were found on the knitting machine after the test and the hose reinforcement layer did not show any irregularities or defects. Table 3 lists the hoses produced.

What is claimed is:

1. A flexible hose adapted for conveying fluids or gases under pressure, said hose extending in an axial direction along a central longitudinal axis and in a radial direction circumferentially about said longitudinal axis, said hose comprising in order
    a core tube (2) having a circumferential inner core tube surface and an opposing circumferential outer core tube surface, said core tube (2) comprising a first elastomeric layer,
    a reinforcement layer (3) surrounding the outer core tube having a circumferential inner core reinforcement surface and an opposing circumferential outer core reinforcement surface,
    said reinforcement layer (3) being of knitted, spiral wound, or braided construction,
    said reinforcement layer (3) formed from at least one yarn (5),
    said yarn (5) having a linear density from 1000 to 4000 dtex,
    said yarn (5) composed of 2 to 5 yarn strands (6),
    said yarn strands (6) being ply-twisted to 1 to 5 twist multiplier,
    said yarn strands (6) composed of 1 to 5 spun yarns (7),
    said spun yarns (7) being ply-twisted to 1 to 5 twist multiplier,
    said spun yarns (7) comprising a linear density from 100 dtex to 1000 dtex,
    said spun yarns (7) comprising filaments having a length from 80 to 150 mm,
    said spun yarns (7) comprising a twist of at least 200 turns per meter, and
    said spun yarns (7) comprising filaments selected from the group consisting of poly m-phenylene terephthalamide, poly methylene-1,3-benzobisoxazole, polyoxadiazole, polysulfonamide, polyarylene sulfide, polybenzimidazole, polybenzthiazole, polybenzoxaole, or mixtures thereof, and
    a second elastomeric layer (4) surrounding said reinforcement layer (3) on said circumferential outer core reinforcement surface.

2. A flexible hose adapted for conveying fluids or gases under pressure according to claim 1 with said reinforcement layer (3) comprises poly m-phenylene terephthalamide or polyarylene sulfide or mixtures thereof.

3. A flexible hose adapted for conveying fluids or gases under pressure according to claim 1 where said yarns (5), yarn strands (6) or spun yarns (7) are coated with a finish.

4. A flexible hose adapted for conveying fluids under pressure according to claim 1 where said elastomeric material comprises hydrogenated nitrile rubber, silicone rubber, fluorosilicone rubber, methylphenylsilicone rubber, natural rubber, EPDM, CPE or acrylic rubber.

5. A flexible hose adapted for conveying fluids or gases under pressure according to claim 1 comprising two or more said reinforcement layers (3).

6. A flexible hose adapted for conveying fluids or gases under pressure according to claim 1 where said core tube (2) is lined with a fluorocarbon based material.

7. A flexible hose adapted for conveying fluids under pressure according claim 1 where said reinforcement layers (3) are knitted.

8. A flexible hose adapted for conveying fluids under pressure according claim 7 where said first reinforcement layer has 160 to 660 loops per meter.

* * * * *